Jan. 27, 1931.    M. SCHNAIER    1,790,025
COMPRESSION COUPLING
Filed Dec. 26, 1924

INVENTOR
Milton Schnaier
BY
Dean, Fairbank, Obright & Hirsch
his ATTORNEYS

Patented Jan. 27, 1931

1,790,025

UNITED STATES PATENT OFFICE

MILTON SCHNAIER, OF NEW YORK, N. Y.

COMPRESSION COUPLING

Application filed December 26, 1924. Serial No. 757,993.

The coupling of the present invention is primarily designed for use in connection with relatively light metal pipes such as brass pipes or pipes of suitable brass alloys which are too thin to stand threading.

The advantages of using rustless piping in all sorts of plumbing fixtures have long been recognized but the cost of brass pipes has previously rendered their use prohibitively expensive except in very high class installations, and when thus used, the brass pipes have been of substantial thickness and no new problems have been involved in coupling them together.

The comparatively recent development of a thin gauge pipe of a cheap brass alloy which bids fair to supplant entirely the use of iron piping in all ordinary plumbing fixtures renders desirable the provision of a readily attachable coupling by which adjacent pipe ends may be firmly gripped and held in such a manner that the pipes themselves will not be damaged, in such a manner that leakage cannot occur, and without resorting to the use of weakening screw threads on the pipe ends.

I have found that the various devices which have been developed at different times for coupling flexible hose pipes will not serve the purpose, since, generally speaking, the problem involved in coupling a pair of thin metal pipes and coupling the sections of a thick flexible hose are quite different. For all ordinary purposes, a slight leakage at a hose pipe coupling is of no moment because such couplings are almost always used out doors or in places where a slight leak can do no appreciable damage. Circumferentially gripping the hose and compressing it at one point renders it leak proof enough for all ordinary purposes. For connecting two thin brass pipes however, which are to be used for plumbing in buildings where a leak, however slight, is fatal, the use of a coupling which grasps a pipe end circumferentially only at one point would be altogether unsatisfactory, especially in view of the fact that the pipe is relatively incompressible.

The ordinary pipe coupling on the other hand, involves weakening the pipe by a threading operation which is practically impossible with the pipe of the character which I intend to couple and consequently I find it necessary to embody in the coupling member features which have been previously unnecessary and superfluous in the coupling of either flexible hose pipes or heavy pipes of iron or brass.

In a preferred embodiment of the invention, the ends of the two pipe sections to be coupled are annularly flared and receive the tapered ends of a cylindrical coupling member having a central portion preferably of greater external diameter than the diameter of the mouths of the flared pipe ends. Suitably shaped nuts, coacting with the threads on the exterior of the coupling members, serve to press annular wedging members against the exterior of the flared pipe ends so that they are firmly wedged between the tapered ends of the coupling member and the wedges. The wedges and coupling member firmly grip the pipe ends throughout a substantial area rather than at a single point so that leakage is effectively guarded against and at the same time I eliminate the danger of biting deeply into the pipe ends and weakening or injuring them.

It is among the objects of the invention to provide a coupling of the general character above noted which may be quickly, and effectively applied without the use of any tools except an ordinary wrench and at the same time to provide a coupling member which is of comparatively simple and inexpensive construction.

A further feature of the invention is to provide for subsequent tightening of the coupling member in the event that leakage should occur due to the wear or continued vibration of the pipe sections.

The invention may be more fully understood from the following description in connection with the accompanying drawings, wherein.

Figure 1:
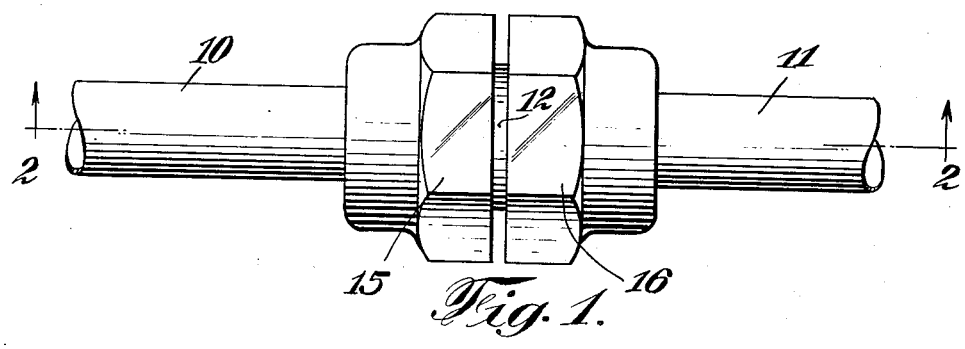
Fig. 1 is a view in elevation of a pair of pipes connected by my improved coupling.

Reference characters 10, 11 indicate a pair of coaxial pipe sections, the pipe being preferably of brass, of a brass alloy, or of other cheap, thin-gauge, rust proof metal. The adjacent ends of the pipe sections 10 and 11 are slightly flared to provide bell mouths 10a and 11a. This flaring may be accomplished by the use of a hand operated spinning tool inserted in the pipe ends. With the form of invention shown in Figures 1 and 2 of the drawings, the coupling member 12 is provided exteriorly with right and left hand threads 13, 14 which are preferably rolled on and of substantial size. The coupling member is in the nature of an open ended cylinder having annular tapered grooves 13a, 14a in opposite ends thereof, which extend longitudinally of the cylinder and accommodate the bell mouthed ends of the pipe sections, groove 14a being considerably longer or deeper than groove 13a for a purpose which will later appear. Preferably the inner walls of the grooves are bevelled at an angle which is slightly greater than the angle of flare at the ends of the pipe sections so that some wedging action occurs when the pipe ends are forced into the grooves. The outer walls of the grooves are preferably substantially straight being parallel with the pipes and the exterior of the coupling member.

Annular wedging members 13b, 14b are adapted to encircle the pipe sections and be slid home over the outside of the bell mouths of the pipes, firmly clamping the flared pipe ends between the wedges and the sloping inner walls of the grooves 13a, 14a, the wedges in turn jamming between the exterior of the flared pipe ends and the straight walls at the exterior of these grooves.

A pair of nuts 15, 16 are interiorly threaded at 15a, 16a for engagement with the threads 13, 14 of the coupling member and are preferably of hexagonal or other polygonal exterior shape to facilitate the application of a tightening wrench. These nuts include annular inwardly projecting flanges constituting tail pieces 15b, 16b having an internal circumference slightly larger than the circumference of the unflared portions of the pipe sections, said flanges engaging with the wedge pieces 13b, 14b as the nuts are screwed home and jamming the wedges firmly into position. If desired suitable number of washers 17 of the same material as the wedges may be interposed between the ends of the wedges and the tail pieces of the nuts for a purpose described hereinafter.

It will be noted that the bell mouthed pipe ends are firmly clamped throughout their entire area between the wedging members, which are preferably of harder metal than the parts coacting therewith, and the walls of the grooves in the coupling members so that a friction fit extending over a substantial area of the pipe end is obtained and at the same time the pipes are not injured by cutting them or straining them at a single point as would be the case if an annular clamping member without substantial width were employed.

Screw threads frequently prove a source of inconvenience due to leakage if any considerable fluid pressure is applied thereto. Such leakage is theoretically impossible if the threads are very accurately formed, but accuracy is not dependable with the ordinary coupling when the threads are very roughly cut to keep the cost of construction within reasonable bounds.

In a pipe equipped with couplings of the types herein described, fluid pressure is not applied at any threaded connection but is sustained at the long wedging joint between the pipe ends, the coupling members and the wedging members so that leak is substantially precluded.

Figure 3:
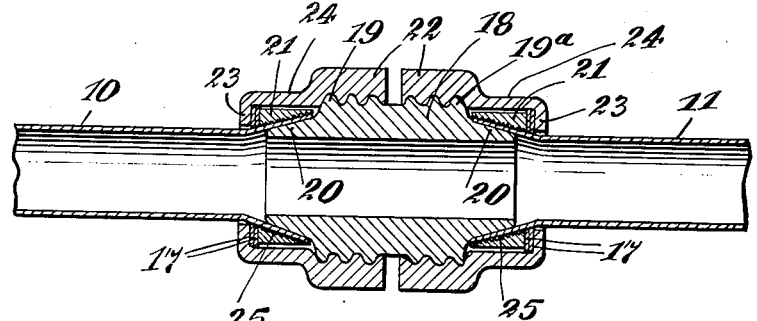
Fig. 3 is a view similar to Fig. 2 illustrating a slight modification.

In Figure 3, I have illustrated a modified form of construction in which the grooves in the coupling member are eliminated, the coupling member simply consisting of a cylinder 18 of an internal diameter approximately the same as the unflared portions of the pipe sections. Right and left hand threads 19, 19a are provided on the exterior of the coupling member similar to the threads of Figure 1 and the ends of the coupling member are exteriorly bevelled or tapered as indicated at 20 to tightly fit within the bell mouths of the pipe sections.

The tapered portions 20 at the exterior of the coupling members serve substantially the same function as the bevelled inner walls of the grooves in the coupling member of Fig. 1. The annular wedging members 21 however, are clamped directly between the bell mouthed pipe ends and the interior of the nuts 22, being forced into place by tail flanges 23 as above described. To accomplish the most efficient wedging action the tail pieces are connected to the body of the nuts by integral cylindrical extensions 24 of slightly greater diameter than the extreme exterior diameter of the bell mouths and of a length corresponding approximately to the length of the wedges. In this instance, I have shown the wedge members as ribbed or corrugated at 25 to insure a firmer binding engagement against the flared pipe ends. These teeth or ribs will pinch the pipe slightly but will not cut into it to an extent where its strength is seriously impaired. Washers 17 may also be used between the outer end of the wedging members and the tail pieces of the nuts for the same purpose set forth hereafter, as in Figures 1 and 2.

Figure 2:
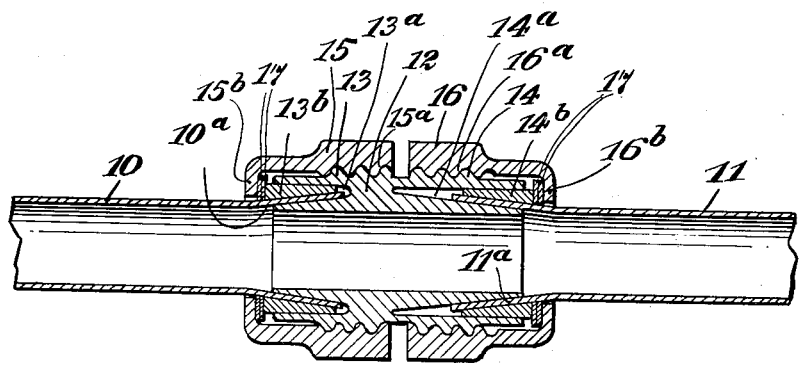
Fig. 2 is a view in longitudinal section through the pipes and coupling, taken on line 2—2 of Fig. 1.

I prefer to use the type of coupling shown in Figs. 1 and 2 where connections are to be made to pipes already installed while the type of Fig. 3 is primarily intended for new installations. The embodiment of Figs. 1 and 2 permits a coupling member which is of considerably greater length than the space between two adjacent pipe ends to be worked into place. It is primarily for this reason that the relatively great depth of slot 14a is provided. In assembling, the nuts 15 and 16 and their associated wedge pieces 13b, 14b are slipped over the pipe ends. The pipe ends are then flared with a suitable spinning tool.

The relatively thin pipes are readily bendable so that the flared end of one pipe section, preferably section 11 may be swung laterally to clear the mouth of the adjacent section 10. Coupling member 12 is then slipped in place and by twisting this member on the pipe, the annularly bevelled surface of the groove 14a will act as a spinning tool to further spread the bell mouth of pipe section 11 and to permit this section to work all the way down into the bottom of the groove 14a. If the coupling member is properly designed, the pipe section 11 may then be permitted to spring back into place, the coupling member clearing the mouth of section 10. No attempt has been made to have the drawings absolutely accurate in this respect. As a matter of fact, it is not essential that the coupling member clear the section 10 since this section may also be bowed outwardly to enlarge the space and its flared end will enter the groove 13 in the coupling member as both pipes are permitted to swing to their normal aligned position. The coupling member is then slid longitudinally until the bell mouth of section 10 snugly engages the bevelled wall 13b of the groove 13. The nuts are slipped along the pipe sections carrying the wedges with them and screwed home. The operation of moving the wedge 14b into place substantially reduces the cross sectional area of the flared end of pipe 11 to the same size as the flared mouth of pipe 10.

The method of assembling the coupling shown in Figure 3 is obvious. The nuts and, if required, the washers are slipped over the pipe ends before they are flared. Opposite ends of the coupling member receive the flared pipe ends and the nuts are then screwed home carrying with them the wedging members. The problem of placing a relatively long coupling member in a relatively short space between two pipes does not occur in new installations and thus for ordinary purposes, the construction of the coupling member may be of the simplified form shown in Figure 3.

From the foregoing description it will be seen that with either form of coupling, the ends of the pipe are firmly clamped and held without injury. The connection of two pipe sections may be quickly accomplished and involves the use of no tools other than the ordinary wrench. In the event that there should be tendency due to wear to leak after the coupling has been effected, it is always possible to obtain a greater pressure by adding washers 17 which permits jamming the wedges farther inward when the nuts are tightened and this assures a tighter joint. This ability to tighten a coupling after installation is quite important in the event that the parts become loosened as for instance, when the pipes are subjected to continuous vibration as on shipboard.

While I have here shown straight line couplings, it will be apparent that the novel features of the present invention may be applied to elbow, T and cross fittings.

It will thus be seen that there is herein described apparatus in which the several features of this invention are embodied, and which apparatus in its action attains the various objects of the invention and is well suited to meet the requirements of practical use.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having thus described my invention what I claim as new and desire to secure by Letters Patent is:—

Means for coupling thin gauge, rust-proof pipes including a cylindrical coupling member having relatively deep annular slots in opposite ends thereof, the inner walls of the slots being conically tapered and adapted to fit the flared ends of an alined pair of said pipes, annular wedging members having an interior surface tapered in accordance with the taper of the inner walls of the slots and adapted to bind the pipe ends against said walls, means for sliding the wedges into clamping position and retaining them in such position, one of the slots being longer but of the same outer diameter as the other for the purpose specified.

Signed at New York, in the county of New York and State of New York this 22 day of December, A. D. 1924.

MILTON SCHNAIER.